United States Patent [19]
Ludwig, Jr. et al.

[11] Patent Number: 5,530,940
[45] Date of Patent: Jun. 25, 1996

[54] COUPLING DEVICE FOR LIGHT PIPE SYSTEM

[75] Inventors: Edward G. Ludwig, Jr., Yardley; Harry J. Lunnemann, Bensalem, both of Pa.

[73] Assignee: Rohm and Haas Company, Philadelphia, Pa.

[21] Appl. No.: 382,746

[22] Filed: Feb. 2, 1995

[51] Int. Cl.$^6$ .................................................. G02B 6/26
[52] U.S. Cl. .......................... 385/31; 385/34; 385/46; 385/146
[58] Field of Search ..................... 385/15, 31, 33, 385/34, 38, 39, 46, 49, 53, 54, 88, 115, 116, 120, 121, 123, 126, 133, 146, 147, 900, 901

[56] References Cited

U.S. PATENT DOCUMENTS

| | | | |
|---|---|---|---|
| 3,204,326 | 9/1965 | Granitsas | 29/872 |
| 3,901,581 | 8/1975 | Thiel | 385/24 |
| 4,400,054 | 8/1983 | Biard et al. | 385/46 X |
| 4,415,953 | 11/1983 | Shepherd | 362/32 |
| 4,496,211 | 1/1985 | Daniel | 385/31 |
| 4,516,828 | 5/1985 | Steele | 385/24 |
| 4,529,830 | 7/1985 | Daniel | 136/246 |
| 4,534,615 | 8/1985 | Iwasaki | 385/121 |
| 4,682,849 | 7/1987 | Kowata et al. | 385/39 |
| 4,867,527 | 6/1989 | Dotti et al. | 385/101 |
| 5,042,900 | 8/1991 | Parker | 385/76 |
| 5,058,985 | 10/1991 | Davenport et al. | 385/115 |
| 5,059,917 | 10/1991 | Stephens | 385/123 X |
| 5,184,882 | 2/1993 | Davenport et al. | 362/32 |
| 5,216,734 | 6/1993 | Grinderslev | 385/60 |
| 5,222,180 | 6/1993 | Kuder et al. | 385/115 |
| 5,222,793 | 6/1993 | Davenport et al. | 362/32 |
| 5,257,168 | 10/1993 | Davenport et al. | 362/32 |
| 5,259,056 | 11/1993 | Davenport et al. | 385/115 |
| 5,268,978 | 12/1993 | Po et al. | 385/33 |
| 5,367,590 | 11/1994 | Davenport et al. | 385/39 |

FOREIGN PATENT DOCUMENTS

| | | |
|---|---|---|
| 449804 | 10/1991 | European Pat. Off. . |
| 501668 | 9/1992 | European Pat. Off. . |
| 568190 | 11/1993 | European Pat. Off. . |
| 2266970 | 11/1993 | United Kingdom . |

*Primary Examiner*—John D. Lee
*Attorney, Agent, or Firm*—Joseph F. Leightner

[57] ABSTRACT

A device for coupling light from a light source to one or more light pipes is described. The device allows for direction of light from a single source through multiple light pipes with minimal loss of light. The device also minimizes heating of the light pipes and provides for an even light intensity distribution over several light pipe surfaces. Potential applications include automotive lighting and interior lighting.

10 Claims, 1 Drawing Sheet

COUPLING DEVICE FOR LIGHT PIPE SYSTEM

The present invention relates to a device for coupling light from a light source to one or more light pipes. The coupling device and the one or more light pipes are parts of a light pipe system.

Light pipes have applications in industrial, commercial and residential lighting where it is desirable to direct light from a single source to one or more remote locations. Typically, a conventional white light source is used with a light pipe system. An example is a simple light bulb. In a light pipe system, the light is transmitted from the source to the desired location by means of one or more light pipes. Light pipes may also be referred to as optical guides or fibers, and vary in length and diameter depending upon particular applications. For example, light pipes may have a diameter as small as 0.001 inch (254 microns). The largest commercially available solid core light pipes have a diameter of about 1 inch (2.54 cm). While larger diameters of light pipes may be used, a 1 inch diameter is sufficient for most applications and light from a typical commercial light source may be readily focused onto a 1 inch light pipe. Solid core light pipes commonly have a coating material, or "cladding", made of a flexible and chemically resistant material.

A coupling device may be used to transmit the light from the source to the light pipe. An example of a coupling device for use with a light projector, which includes a means for connecting several optical guides together, is described in European Patent Application No. 2,266,970. The optical guides are brought together into a common end plug. The end plug may then be inserted into the aperture of a lamp housing so that light from the lamp may be directed onto the end plug and be transmitted through the optical guides. Other connector assemblies are also known.

Several problems occur with the known coupling devices for transmitting light from a source to a plurality of light pipes. A typical light source such as a bulb emits light in all directions. Therefore, much of the light is wasted because the light pipe captures only a fraction of the emitted light. For most efficient collection of light, the light is typically focused onto the light pipes by means of an elliptical reflector placed behind the light source. When several light pipes are to be used, the light pipes are often attached together in a parallel configuration to form a bundle. When the light is focused onto the bundle by means of an elliptical reflector, the intensity of the focused light at the surface of the light pipe is greatest in the center of the bundle. This is often undesirable because, for many applications, an even distribution of light intensity through all the light pipes is preferred.

Another problem arises because light can be absorbed by surface dirt between the light pipes or by cladding material around the light pipes. The amount of light absorbed may be so high as to cause heating of the light pipes and result in damage of the light pipes. The damaged light pipes must then be replaced frequently, which may be costly. In an effort to reduce the heating which can occur when light is focused from a source onto light pipes, a fan is frequently used. This is undesirable, particularly in applications where space is limited or noise is objectionable.

A further problem relates to the packing of light pipes when they are bundled together in a parallel configuration and packed into a single holder to contact a coupler. Cylindrical shaped couplers are commonly used, but when such a grouping of light pipes is used with a coupler of any shape, light is lost because, even if the light pipes are packed into the holder in the closest packing arrangement, the light pipes do not entirely fill the holder. This results in loss of light efficiency because some light is lost to the spaces between the light pipes.

The present invention overcomes these limitations in light pipe coupling devices. It provides a means to isolate the light pipes from the light source and minimize heating, as well as to decrease the loss of light which can occur when light from a single source is focused onto a plurality or "bundle" of light pipes or fibers. The present invention also provides a means to obtain an even distribution of light intensity over a plurality of light pipes from a single light source.

According to a first aspect of this invention, there is provided an apparatus for coupling light from a light source to one or more light pipes, said apparatus comprising:

a) two opposing end faces, one of which, the input face, is adjacent to the light source and the other of which, the output face, is adjacent to the end of the one or more light pipes, and b) at least one transitional piece between the opposing end faces, said transitional piece comprising at least one rectangular surface.

A second aspect of this invention is a light pipe system comprising a light source, one or more light pipes, and an apparatus for coupling light from a light source to one or more light pipes, said apparatus comprising:

a) two opposing end faces, one of which, the input face, is adjacent to the light source and the other of which, the output face, is adjacent to the end of the one or more light pipes, and b) at least one transitional piece between the opposing end faces, said transitional piece comprising at least one rectangular surface.

A further aspect of this invention is a method for coupling light from a light source to one or more light pipes, said method comprising:

1) directing light from a light source to an apparatus comprising:
   a) two opposing end faces, one of which, the input face, is adjacent to the light source and the other of which, the output face, is adjacent to the end of the one or more light pipes, and
   b) at least one transitional piece between the opposing end faces, said transitional piece comprising at least one rectangular surface, 2) conducting the light through the transitional piece from the input face to the output face, and 3) further directing the light from the output face of the apparatus to the one or more light pipes.

The present invention has applications in industrial, residential, medical, commercial and transportation fields. It is useful in applications where it is desired to transmit light from a single source to multiple locations and where space for lighting fixtures is limited, and particularly in hazardous areas where light is required but light fixtures cannot be used because of the presence of liquids, chemicals, explosive materials or other hazards.

The present invention may use any conventional light source. In many applications, a high intensity discharge lamp is preferred. However, other light sources such as, for example, an incandescent or fluorescent lamp, or a wire are all useful with the present invention. Sunlight may also be used. If focused light is required, lenses or focusing mirrors may be used.

The coupling means provided by the present invention requires one or more transitional pieces which are also called "rectangular rods". By "rectangular rod" is meant a solid object having at least two rectangular surfaces. In addition to the two or more rectangular surfaces, a rectangular rod has two opposing end faces at the opposite ends of each rectangular face. The opposing end surfaces may be of any shape, such as, for example, rectangular, trapezoidal, or triangular. One or both of the end surfaces may be square. Preferably, the rectangular rod has six surfaces, of which the two opposing end surfaces are square and the four remaining surfaces are rectangular.

When two or more rectangular rods are used, they are preferably oriented parallel to each other and arranged so that they are packed together as closely as possible. Any number of rectangular rods may be used; for a symmetrical arrangement, 4 rectangular rods in a 2×2 array, or 25 rectangular rods in a 5×5 array, are examples of useful numbers of rods. In one embodiment, it has been found that 9 rectangular rods with square opposing end faces provide a convenient arrangement.

It is preferable that all surfaces are optically smooth to provide for maximum internal reflection of light. The surfaces should also be kept clean to eliminate any scattering of light away from the rod by particulates that may settle on the surfaces. The surfaces may optionally be coated with a material having a lower refractive index than does the material of the rods. Suitable coating materials include fluoropolymers such as, for example, polymethyl-3,3,3 trifluoropropylene-vinylidene. Fluoropolymers may be applied by methods known in the art, including, for example, heat shrinking, direct extrusion, and application in solution form.

The rods may be formed from any substantially transparent solid material, such as inorganic material; for example, glass or quartz; or an organic material such as a polymer; for example, acrylic polymers, polycarbonates, polystyrenes, or other reasonably transparent polymers or copolymers. Quartz or glass are preferred with light sources that are sufficiently intense to cause heating of the rods, because quartz and glass are able to withstand higher temperatures than can polymers. Optical glass is most preferred. In any case, the material should be transparent for most efficient transmission of light. The material may be colored for certain applications.

The size of the light pipes and the rods is determined by the application and the available space for the light pipes. It is not required that the two opposing ends of each rod be the same size. For some applications, it may be preferred that the end adjacent to the light source, the "input" end, be larger than the end adjacent to the light pipes, the "output" end. A larger surface area adjacent to the light source allows more light to be collected, and therefore more light can reach the light pipes. To minimize light loss, it is preferred that the surface at the end of the rod adjacent to the light pipe be of the same size as or smaller than the end surface of the light pipe. It is not required that all of the light pipes or all of the rods be of the same size, although it may be more convenient.

The opposing end surfaces may be perpendicular to the rectangular surfaces of the rectangular rods. However, the opposing end surfaces are not required to be perpendicular to the rectangular surfaces and are not required to be parallel to each other. The angle of the opposing ends of the rods is determined by the desired application and the opposing ends of each rod are not required to be parallel. For example, one or both of the opposing ends may be angled in order to accommodate the direction of the light pipe. This may be desirable when space is limited. The rods may be bent or curved in order to change the direction of the light.

The rods are preferably bundled together and encased in a material to prevent the collection of dust on the surfaces. A solid sheet of flexible material which may be wrapped tightly around the rods is preferred for encasing the rods because this will not allow dust to reach the surfaces. Examples include polytetrafluoroethylene, polyethylene and other polymers. The material should have a refractive index which is less than that of the material from which the rods are made. The refractive index is a numerical indicator of the velocity at which light will travel through a material. It is defined as the ratio between the velocity of light in a vacuum and the velocity of light in a given material. The higher the refractive index, the lower the velocity of light through the material. Air has a refractive index of approximately 1, and materials such as quartz and glass have refractive indices of approximately 1.5. Therefore, for example, because glass has a refractive index of 1.5, light will travel through glass more slowly than it will travel through air. This property also determines the angle at which light will travel through the material. A casing material with a lower refractive index than that of the rods will minimize the loss of light through the surfaces of the rod by allowing for more light to be reflected back into the rods. Therefore, it is preferred that the encasing material has a refractive index between about 1 and about 1.5.

An example of encasing material is fluorinated ethylene-polypropylene copolymer (FEP), which has a refractive index of 1.34.

For optimum coupling of a light pipe to a rod, it is preferred that a means for aligning the rod and the light pipe be used. For maximum efficiency in transmitting light from the rods to the light pipes, a device which can securely hold both the light pipes and the rods and maintain their adjacent surfaces in proximity is preferred. This means may be a solid block, and its construction and composition are not critical. A solid block of a material such as plastic, glass, or wood, is preferred because a solid block will hold the rods and the light pipes firmly, and apertures may be drilled into the material to provide for a secure fit of the rods and light pipes into the block. The size of the block is not critical and is determined by the intended application. For example, a minimum amount of material may be used to make the block if space or material are at a premium. It is not necessary that the entire length of the rods be enclosed within the block; it is only necessary that enough of both the rods and the light pipes be enclosed to securely hold the adjacent faces in proximity. The block may have any shape, such as a disk, and the shape may be determined by the physical surroundings of the block and the light pipe system. For example, it may be desired that the block fit into an outer casing or holder, and the block will then have to be of appropriate size and shape for the holder. A clamp may be used in place of a block. The clamp should securely hold the rods and the light pipes.

If a block is used, it is preferred that the block be made of a polymeric material such as: poly(tetrafluoroethylene) (TFE resin); poly(fluorinated ethylene propylene) (FEP resin); poly(perfluoroalkoxy copolymer) (PFA resin); poly(perfluoropropyl vinyl ether) (PPVE resin); poly(vinylidene fluoride) (PVDF resin); and copolymers thereof. These polymers, in addition to being readily machined, have desirable refractive indices and will therefore not contribute significantly to scattering and loss of light. Optimally, the diameter of a light pipe will be equal to the longest diagonal dimension of the input face of the rod with which it is coupled, and the block has apertures of a diameter which provides a snug fit for the rods and the light pipes.

Air space between the adjacent surfaces of the rods and the light pipe may lead to significant loss of light because of the difference in light refraction by air from that of solid materials such as glass. In order to minimize scattering and loss of light at the adjacent surfaces between a light pipe and a rod, it is preferable that a refractive index matching fluid be used. A refractive index matching fluid is a fluid which minimizes the loss of light due to scattering from surfaces because it has a refractive index close to that of the rod material. By the placing between the adjacent surfaces of a liquid which has refractive properties similar to those of the rod material, such scattering may be minimized. Examples of suitable refractive index matching fluids include oil, water and organic liquids. Commercial refractive index matching fluids are available. If the rods are polymeric, it is preferable to use as a refractive index matching fluid a polymer of similar composition to the rods. For example, with acrylic rods, uncrosslinked poly(ethylacrylate) is a suitable refractive index matching fluid. If the adjacent surfaces of the rods and the light pipes are polished and free of all particulate matter, a refractive index matching fluid may not be required.

When a refractive index matching fluid is selected, compatibility with the rod material is critical to avoid damaging or clouding of the surfaces of the rods. The refractive index matching fluid must also be thermally and photochemically stable.

If desired, an adhesive may be used to hold the adjacent surfaces of the rods and the light pipe together. The composition of the adhesive will be dictated by the composition of the light pipes and of the rods, and by the application for which the light pipes are to be used. Adhesives useful for this purpose include optical adhesives, two-part reactive adhesives, and transparent glues. It is preferable that the adhesive absorb no light and be able to withstand the increased temperatures that can develop with some light sources. Optical adhesives are known in the art. Some adhesives may also function as refractive index matching fluids. The adhesive must also be thermally and photothermally stable.

The light pipes for use in the present invention may be of any practical dimension. The ratio of the length of the light pipes to their diameters may be as low as 1:1 with no theoretical upper limit, with ratios within the range from 10:1 to 1000:1 being preferred for most practical applications. In communications applications, optical fibers may be several miles long. The composition of the light pipes is not critical, but is preferably a clear, durable material such as optical glass, quartz, or transparent plastic such as acrylic. Preferably, the light pipes have a coating material, or "cladding", which has a lower refractive index than do the light pipes. However, some cladding materials may lead to wicking of the refractive index matching fluid out of the space between adjacent surfaces. This may be avoided by choosing a cladding material which will not wick the fluid. Examples are heat shrinkable thermoplastic and a reactive polymeric coating which may be applied as a liquid and then polymerized. In addition to a cladding, a transparent, translucent, or opaque sheathing may be applied as an outer layer. The sheathing may be a transparent, translucent or opaque thermoplastic or thermoset polymer. Examples of useful sheathing materials include polyethylene, linear low density polyethylene (LLDPE), polypropylene, acrylic polymers, polystyrene, polycarbonate, polyvinyl chloride, polyurethane, and various engineering resins, and mixtures thereof. The sheathing material may be colored or contain absorptive and/or fluorescent dyes. It may contain flame retardants, crosslinking additives, or light scattering materials such as an immiscible polymer, particulate inorganics such as $TiO_2$, or forward-scattering organic particles such as Plexiglas L™ acrylic resin.

It is preferred that an additional solid, transparent material be placed between the light source and the light pipe system. The solid, transparent material may be any material which is suitable for the rectangular rods: glass or quartz; or an organic material such as a polymer; for example, acrylic polymers, polycarbonates, polystyrenes, or other reasonably transparent polymers or copolymers. It is preferred that the material be the same as that of the rectangular rods, and that the piece of material have the same shape and dimensions of the bundled rectangular rods. For example, if 9 rectangular rods, each having square opposing end faces 1 cm long, are bundled together, the solid material between the rods and the light source will have square opposing end faces 3 cm×3 cm. It is preferred that the solid material be rectangular in shape in order to provide a more uniform distribution of light to the input end of the rectangular rods. The size of the square face of the solid material adjacent to the light source will depend upon the size of the light source and, if the light is focused, depends on the size of the light spot that reaches the solid material. It is often preferred that a reflector, such as, for example, an elliptical reflector, be used. The reflector may be placed behind the light source so that the light is reflected toward the light pipe system. For example, a typical 60 Watt light source placed in front of an elliptical reflector will produce a light spot about 15 mm in diameter. Therefore, in order to capture as much light as possible, the face of the solid material nearest the light source should be at least 15 mm×15 mm. For optimal uniformity of light distribution over the input faces of the rectangular rods, it is also preferred that the length of the solid material be approximately ten times the width of the side of the solid material. This is illustrated in FIG. 1, where "x" represents the width of a side of the rectangular solid material, and "10x" represents the length of the rectangular solid material. For example, a rectangular block of solid material having an end face that is 1 cm×1 cm optimally has a length of 10 cm.

Following is one embodiment of the present invention. This serves as an example of the dimension and materials which may be used in the invention. The numbers refer to FIGS. 1 and 2.

A high intensity discharge lamp (7) is used as the light source. An elliptical reflector (8) is placed behind the lamp. The lamp housing has an opening of 12 mm×12 mm. Nine rods of optical glass (2), each having two square opposing faces 4 mm×4 mm and four rectangular sides 4 mm×12 cm, are arranged in a square pattern, bundled together, and wrapped with polytetrafluoroethylene. A solid rectangular block of optical glass (1), 12 cm long and having square end faces 12 mm×12 mm, is placed into the lamp housing (not shown). The bundled rods are then placed at the opposite end of the solid block of glass. The ends of the rods to be adjacent to the light pipes are inserted into a disk made of polytetrafluoroethylene (3, 9), into which nine apertures, each of 5.8 mm diameter, have been drilled (10). The apertures are in a 3×3 array, approximately 1 mm apart. Acrylic adhesive is placed on the end of each rod at (4). The light pipes (6), clad with fluorinated polyethylene polypropylene copolymer (5), and having a diameter of 5.6 mm including the cladding, are inserted into the apertures from the opposite side of the block so that the ends of the light pipes contact the ends of the glass rods (4).

Figure 1:
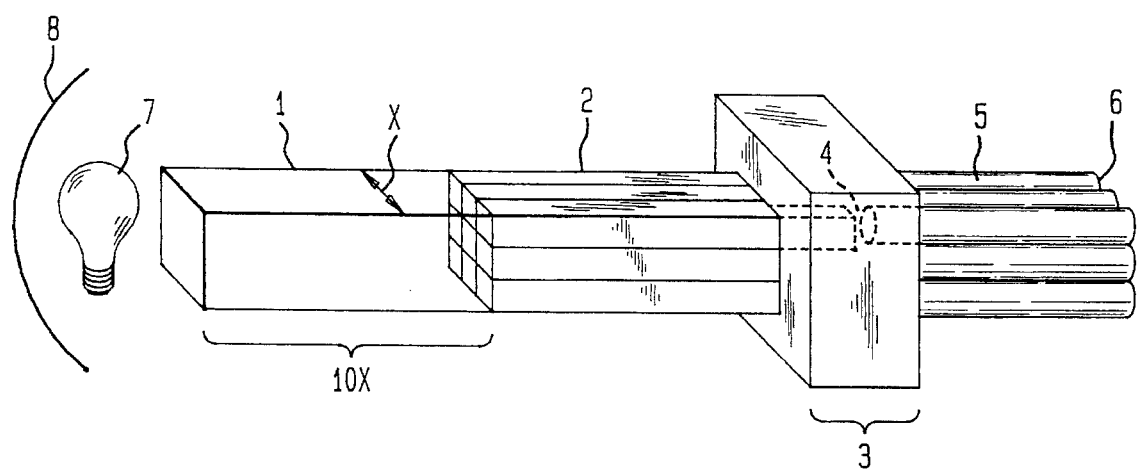
FIG. 1 is a schematic representation of one embodiment of the invention.
Figure 2:
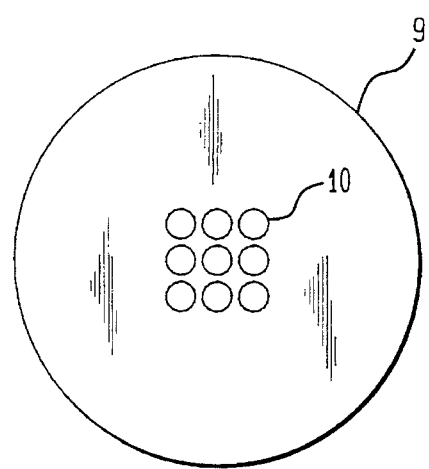
FIG. 2 is a cross-sectional view of the connecting block of polytetrafluoroethylene, item 3 in FIG. 1.

What is claimed is:

1. An apparatus for coupling light to one or more light pipes, said apparatus comprising:
   a) a lamp; and
   b) a coupling means comprising one or more rectangular rods, each rectangular rod having two opposing end faces, one of which, the input face is adjacent to the lamp and the other of which, the output face, is adjacent to the end of the one or more light pipes at least one transitional piece between the opposing end faces, said transitional piece comprising at least one rectangular surface.

2. The apparatus of claim 1, further comprising a solid transparent rectangular shaped material between the lamp and the input face of the coupling means, said rectangular shaped material having two opposing square faces and four rectangular faces, wherein one square face is adjacent to the light source, and wherein the length of the rectangular faces is ten times the width of the square face adjacent to the lamp.

3. The apparatus of claim 1 wherein the transitional piece is made from a material selected from: glass, quartz, and polymeric materials.

4. The apparatus of claim 1 comprising 9 transitional pieces, wherein each transitional piece has 4 rectangular faces and 2 square faces.

5. The apparatus of claim 1 wherein the transitional piece is made from a polymeric material selected from: polystyrenes, polycarbonates, polyacrylates, polymethacrylates and copolymers thereof.

6. The apparatus of claim 1 wherein at least one of the opposing faces of the transitional piece is square.

7. The apparatus of claim 1 wherein the transitional piece is encased in a solid material selected from: polyethylene, linear low density polyethylene, polypropylene, acrylic polymers, polystyrene, polycarbonate, polyvinyl chloride, polyurethane, and mixtures thereof.

8. The apparatus of claim 1 further comprising, between the output face of at least one rectangular rod and the adjacent surface of at least one light pipe, at least one refractive index matching fluid selected from the group consisting of oils, gels, fluids, adhesives and polymers.

9. The apparatus of claim 1 further comprising a means for maintaining the output end of at least one rectangular block in proximity with the adjacent face of at least one light pipe, said means comprising a block of material selected from the group consisting of: glass, wood, metal, and polymeric materials, said block having apertures into which are inserted said light pipe and said rectangular block.

10. A method for coupling light from a light source to one or more light pipes, said method comprising:
   1) directing light from a light source to an apparatus comprising: one or more rectangular rods, each rectangular rod having two opposing end faces, one of which, the input face, is adjacent to the end of the lamp and the other of which, the output face, is adjacent to the end of the one or more light pipes, anal at least One transitional piece between the opposing end faces, said transitional piece comprising at least one rectangular surface;
   2) conducting the light through the one or more rectangular rods from the input face to the output face; and
   3) further directing the light from the output face of the apparatus to the one or more light pipes.

* * * * *